(12) United States Patent
Yamamoto (10) Patent No.: US 6,713,166 B2
(45) Date of Patent: Mar. 30, 2004

(54) LAMINATING FILM AND LAMINATE (75) Inventor: Takeshi Yamamoto, Moriyama (JP)

(73) Assignee: Gunze Co., Ltd., Ayabe (JP)

( * ) Notice: Subject to any disclaimer, the term of this patent is extended or adjusted under 35 U.S.C. 154(b) by 0 days.

(21) Appl. No.: 10/130,264

(22) PCT Filed: Sep. 28, 2001

(86) PCT No.: PCT/JP01/08612
§ 371 (c)(1),
(2), (4) Date: May 24, 2002

(87) PCT Pub. No.: WO02/26495
PCT Pub. Date: Apr. 4, 2002

(65) Prior Publication Data
US 2002/0187323 A1 Dec. 12, 2002

(30) Foreign Application Priority Data
Sep. 28, 2000 (JP) ......................................... 2000-295873

(51) Int. Cl.⁷ .............................. B32B 7/02; B32B 27/32
(52) U.S. Cl. ..................... 428/215; 428/213; 428/214; 428/216; 428/328; 428/461; 428/463; 428/516; 428/520
(58) Field of Search ................................ 428/213, 214, 428/215, 216, 328, 461, 463, 516, 520

(56) References Cited

FOREIGN PATENT DOCUMENTS

| EP | 0 987 102 | 3/2000 |
|----|-----------|--------|
| JP | 62-230876 | 10/1987 |
| JP | 11-147283 | 6/1999 |
| JP | 2000-025177 | 1/2000 |
| JP | 2000-109066 | 4/2000 |
| JP | 2000-246836 A | 9/2000 |
| WO | WO 89/03308 | 4/1989 |
| WO | WO 96/25292 | 8/1996 |

Primary Examiner—D. S. Nakarani
(74) Attorney, Agent, or Firm—Westerman, Hattori, Daniels & Adrian, LLP (57) ABSTRACT To provide a laminate film having better shaping processability than conventional laminate films by disposing between the first resin layer 1 and the adhesive layer 3 the second resin layer 2 which has a Vicat softening point lower than that of the first resin layer, has a melting point lower than that of the first resin layer by 2° C. or more, is at least 0.5 times thicker than the first resin layer, and contains as the main component a propylene-α-olefin copolymer. In addition, it becomes possible to provide the laminated structure 5 having the laminate film provided with the second resin layer 2 on the substrate 4. Hence, the present invention has great industrial significance.

9 Claims, 3 Drawing Sheets

LAMINATING FILM AND LAMINATE

TECHNICAL FIELD

The present invention relates to a laminate film fixedly bonded on the surface of a substrate, and a laminated structure including the laminate film fixedly bonded to the substrate. To be more specific, the present invention relates to a laminate film having a polypropylene resin layer for coating the substrate, and a laminated structure including the polypropylene resin layer with which a surface of the substrate is coated. Above all, the present invention relates to a laminated metal sheet, which is to be processed into a predetermined shape by a draw-forming process or the like, and a laminate film for forming the laminated metal sheet.

BACKGROUND ART

There have been studies and researches on films to be laminated on the surface of a substrate, and it has been desired to develop a highly adhesive film, which is fixedly bonded to a metal substrate (hereinafter referred to as the film for metal lamination). The film for metal lamination is a protective film mainly for protecting the metal substrate from corrosion damage.

In recent years, it has become possible to produce laminate films excellent in adhesion to a metal sheet (hereinafter referred to as the film for metal sheet lamination). The typical conventional film for metal sheet lamination is a two-layer film composed of a resin layer made from polyolefin and an adhesive layer made of an adhesive agent, which is adhesive to metal (hereinafter referred to as the metal adhesive agent). To be more specific, in one such two-layer film, polyethylene, polypropylene, or an ethylene-propylene copolymer is used as polyolefin.

The above-mentioned conventional two-layer films have no problem in being laminated on the surface of a metal material already processed into a predetermined shape. However, when a steel sheet on which a laminate film is fixedly bonded (hereinafter referred to as laminate steel sheet) is processed into a predetermined shape, in particular, by a draw-forming process, the conventional two-layer films are highly likely to whiten or break. To be more specific, when the laminate steel sheet provided with a conventional two-layer film is formed into cans, the yields of quality cans are low due to the whitening or breakage of the conventional two-layer film during the draw-forming process.

DISCLOSURE OF THE PRESENT INVENTION

The present invention has been contrived in view of the aforementioned situation, and its first object is to provide a laminate film which can retard the deterioration of the anticorrosion function of the laminate film caused by its whitening or breakage during a shaping process such as a draw-forming process. The second object of the present invention is to provide a laminated structure to which the laminate film of the present invention is fixedly bonded. The following is a description of the above-mentioned laminate film and the above-mentioned laminated structure.

(I) Laminate Film

The first object can be achieved by a laminate film comprising: an adhesive layer composed of an adhesive agent; a first resin layer composed of a polypropylene resin and the first resin layer being formed above the adhesive layer; and a second resin layer formed between the first resin layer and the adhesive layer, the second resin layer containing a propylene-α-olefin copolymer as a main component, the second resin layer being at least 0.5 times thicker than the first resin layer, the second resin layer having a Vicat softening point lower than that of the first resin layer, and the second resin layer having a melting point lower than that of the first resin layer by 2° C. or more. The laminate film of the present invention is characterized by having the second resin layer disposed between the adhesion layer and the first resin layer.

The first resin layer contains either a polypropylene resin only or a polypropylene resin and an additive agent. When the first resin layer contains the polypropylene resin and the additive agent, it is necessary to contain the polypropylene resin essentially and the additive agent in trace amounts. The polypropylene resin can be a resin composed of propylene homopolymers having a single NMR pentad fraction or a resin obtained by mixing plural kinds of propylene homopolymers having different NMR pentad fractions.

The second resin layer, to be more specific, can be a resin layer exclusively composed of a propylene-α-olefin copolymer, a resin layer exclusively composed of a copolymer of propylene and α-olefin copolymer rubber, or a resin layer composed of a mixture material of a copolymer of propylene and α-olefin copolymer rubber and a rubber material. The second resin layer can be a resin layer further containing a petroleum resin or a resin layer further containing rosin, rosin ester or a terpene resin, or a hydrogenated materials of these.

The "propylene-α-olefin copolymer" cited in the present specification is a copolymer of propylene and α-olefin other than propylene. For example, it can be a copolymer consisting of two components: propylene and one type of α-olefin other than propylene, or a copolymer composed of at least three components: propylene and plural α-olefins which are different in type from each other and other than propylene. The copolymer is a general term for random copolymers, block copolymers, and graft copolymers. To be more specific, the propylene-α-olefin copolymers include a propylene-ethylene random copolymer, a propylene-butene random copolymer, a propylene-ethylene block copolymer, and a propylene-ethylene-butene random copolymer. The "copolymer of propylene and α-olefin copolymer rubber" in this specification means a block polymer of propylene and α-olefin copolymer rubber, and a graft copolymer of propylene and α-olefin copolymer rubber. The "rubber material" cited in this specification means a kind of rubber material included in rubbers. The second resin layer can contain plural types of rubber materials. The rubbers include ethylene-propylene rubber, ethylene-butene rubber, propylene-butene rubber, and hydrogenated styrene-diene rubber. The "petroleum resin" in this specification is an aggregate of polymers obtained by polymerizing fractions mainly composed of a mono-olefin group and a diolefin group as the byproduct in refining ethylene from petroleum in an ethylene plant, and an aggregate of hydrogenated polymers obtained by hydrogenating the polymers. The petroleum resin is a general term for aliphatic petroleum resins, aromatic petroleum resins, and alicyclic petroleum resins.

When the above-mentioned adhesive agent contains an acid-modified propylene polymer, the adhesion between the adhesive layer and the metal substrate is secured. As a result, the film for metal lamination can be provided. The "acid-modified propylene polymer" in this specification means a polymer obtained by substituting the fundamental components (polymer units) of the propylene polymer by acid components or by substituting part of the propylene polymer by acid components. The "propylene polymer" in this specification means a polypropylene or a propylene copolymer mainly composed of propylene. Thus, the acid-modified propylene polymer can be an acid-modified propylene homopolymer, or an acid-modified propylene-α-olefin copolymer.

When the first resin layer has a melting point not less than 155° C., a laminate film fixedly bonded to the substrate through welding can be provided. As a result, in the depositing process the film can be prevented from sticking to the heating device or the cooling device. Thus, it becomes possible to form a substrate which is coated with a laminate film excellent in surface smoothness.

When at least one of the first resin layer, second resin layer, and adhesive layer contains zinc oxide fine particles, the obtained laminate film is capable of suppressing the permeation of a sulfide. This is because the zinc oxide fine particles have the property of absorbing a sulfide such as hydrogen sulfide. (II) Laminated structure The above-mentioned second object can be achieved by a laminated structure comprising: a substrate; an adhesive layer composed of an adhesive agent and the adhesive layer being formed on a surface of the substrate; a first resin layer composed of a polypropylene resin and the first resin layer being formed on the adhesive layer; and a second resin layer formed between the first resin layer and the adhesive layer, the second resin layer containing a propylene-α-olefin copolymer as a main component, the second resin layer being at least 0.5 times thicker than the first resin layer, the second resin layer having a Vicat softening point lower than that of the first resin layer, and the second resin layer having a melting point lower than that of the first resin layer by 2° C. or more. The laminated structure of the present invention is characterized in that the laminate film formed on the surface of the substrate has a second resin layer between the adhesive layer and the first resin layer.

When the substrate is a steel sheet, the adhesive agent contains acid-modified polypropylene, and the first resin layer has a melting point of not less than 155° C. and a thickness of 0.1 μm to 10 μm, it becomes possible to provide a laminate steel sheet excellent in shaping processability and whose first resin layer never whitens or breaks even if the steel sheet is subjected to a shaping process such as a draw-forming process.

The "steel sheet" in this specification means an iron sheet, an iron base alloy sheet, a metal-plated iron sheet, a metal-plated iron base alloy sheet, or surface-treated sheets formed by treating the surface of these. Here, the surface treatment is a treatment to reform the surface in order to improve mainly the strength of adhesion. The steel sheet can be, to be more specifically, an iron sheet, tin-free steel sheet, a tin-plated steel sheet (tin plate), a nickel-plated steel sheet, a chrome-plated steel sheet, an anchor-processed steel sheet, or a primer-processed steel sheet. In the case of applying a shaping process by means of a draw-forming process, a steel sheet of 0.1 to 5 mm thick is generally used.

When either one of the adhesive layer, the first resin layer, and the second resin layer further contains zinc oxide fine particles, it becomes possible to provide a laminated structure excellent in corrosion resistance against a sulfide such as hydrogen sulfide.

Figure 1:
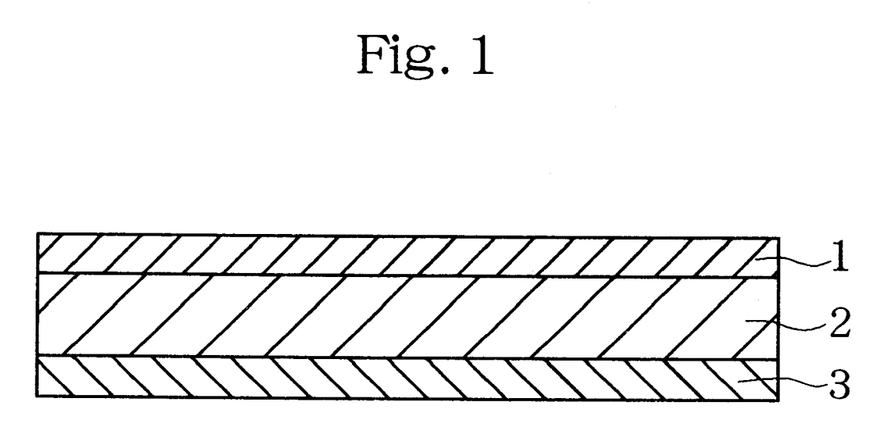
FIG. 1 is a cross sectional view conceptually showing an example of the laminate film of the present invention.

BEST MODE FOR CARRYING OUT THE INVENTION (I) The laminate film of the present invention will be described based on FIG. 1. FIG. 1 is a cross sectional view conceptually showing an example of the laminate film of the present invention. In the manufacturing of the laminate film, any well-known art can be used to fabricate the laminate film. In terms of fabricating a laminate film excellent in the thickness of each layer and the uniformity of the thickness, it is preferable to apply a co-extrusion method and a co-stretching method. When the co-extrusion method and co-stretching method are applied, a biaxial stretching film having a desired thickness can be formed easily, and the cost of manufacturing can be suppressed.

The first resin layer 1 is preferably composed of a mixture of a propylene homopolymer whose NMR pentad fraction is not less than 97% and preferably not less than 98% and a propylene homopolymer whose NMR pentad fraction is not more than 96% and preferably not more than 95%. The use of the above-mentioned mixture realizes a laminate film which is more unlikely to break or whiten in the draw-forming process for can formation, while maintaining heat resistance. The percentage of propylene homopolymer content having not less than 97% of NMR pentad fractions is 5 to 90%, and preferably 15–70%, and more preferably 30% to 50% of the mixture. When the percentage of propylene homopolymer content is below 5%, heat resistance is insufficient, whereas when it is not less than 90%, the heat resistance is excellent; however, the laminate film is likely to break or whiten during the draw-forming process.

The thickness of the first resin layer 1 is 0.1 to 10 μm, preferably 0.2 to 5 μm, and more preferably 0.4 to 3 μm. When it is below 0.1 μm, the film tends to stick to the machine while it is heated or cooled for a laminating process. On the other hand, when it is over 10 μm, the film is more likely to break or whiten during the draw-forming process.

The preferable types of the materials for the second resin layer 2, and the preferable percentage of each material content of the second resin layer 2 that is composed of a material mixture will be described. The second resin layer 2 can be preferably a resin layer composed of a propylene-ethylene block copolymer, a resin layer composed of a copolymer of propylene and ethylene-propylene rubber, or a resin layer composed of a mixture of a propylene-α-olefin copolymer and ethylene-propylene rubber. It can be further preferably a resin layer composed of a mixture of a propylene-ethylene-butene random copolymer and ethylene-propylene rubber. The percentage of rubber material content in the mixture material composing the second resin layer 2 is preferably 5 wt % to 45 wt %.

When the second resin layer 2 further contains a petroleum resin, a hydrogenated petroleum resin having a Vicat softening point of 110° C. to 150° C., preferably 115° C. to 145° C., and more preferably 120° C. to 140° C. is used. The percentage of petroleum resin content is adjusted to 1 wt % to 30 wt %, preferably 2 wt % to 20 wt %, and more preferably 3 wt % to 15 wt %. When the second resin layer 2 thus contains a petroleum resin, the addition of the petroleum resin increases the amorphous portion in the second resin layer 2. The increase in the amorphous portion in the second resin layer 2 reduces the inherent orientation of the second resin layer 2 smoothly and rapidly through a heating process and a cooling process to laminate the layer 2 onto the substrate. Therefore, the reduction of the orientation can decrease the whitening or breakage of the first resin layer 1 in the shaping process of the laminated structure such as a draw-forming process. The reduction of the orientation can also improve stretching stability and thickness precision remarkably in the manufacturing of a laminate film having a step of the draw-forming process. The second resin layer can contain rosin, rosin ester, a terpene resin, or hydrogenated materials of these. When the second resin layer contains rosin, rosin ester, a terpene resin, or hydrogenated materials of these, the same effects can be expected as the case where the second resin layer contains the petroleum resin.

When the second resin layer 2 has a Vicat softening point (also referred to as Vicat softening temperature) lower than that of the first resin layer 1, the first resin layer is unlikely to whiten or break in the shaping process. However, when the Vicat softening point of the second resin layer 2 is higher than 160° C., the layer is more likely to whiten or break in the shaping process, and when the Vicat softening point of the second resin layer 2 is lower than 80° C., there are problems in thickness uniformity in the film formation or characteristic stability of the film materials. For example, when extrusion is applied in the manufacturing of a laminate film, the obtained film may have uneven thickness, and when stretching is applied in the manufacturing of a laminate film, whitening or breaking may be caused. Therefore, as the second resin layer 2 a resin layer having a Vicat softening point of not less than 80° C. nor more than 160° C. is preferable, and more preferably not less than 80° C. nor more than 130° C.

When the second resin layer 2 has a melting point lower than that of the first resin film by 2 degrees or more, the first resin layer 1 is unlikely to whiten or break in the shaping process. The second resin layer 2 preferably has a melting point lower than that of the first resin layer 1 by 10° C. or more, and more preferably a melting point lower than that of the first resin layer 1 by 20° C. or more. However, when the melting point of the second resin layer 2 is lower than that of the first resin layer 1 by 60° C., there may be problems in thickness uniformity in the film formation or characteristic stability of the film materials. Therefore, the preferable temperature difference in the melting point between the second resin layer 2 and the first resin layer is not more than 60° C.

When the second resin layer 2 is designed to have a thickness not exceeding 0.5 times the thickness of the first resin layer 1, it is impossible to fully prevent the first resin layer 1 from whitening or breaking in the shaping process. Therefore, it is preferable that the second resin layer 2 is at least 0.5 times thicker than the first resin layer 1.

From the viewpoint of the strength of adhesion to the metal substrate, the acid-modified propylene polymer of the adhesive layer 3 is preferably an acid-modified propylene homopolymer, particularly a propylene homopolymer having a melt flow rate (MFR) of 1 to 30 g/10 min (MFR measuring requirements: 230° C., 21.18 N), and the acid component is preferably unsaturated carboxylic acid or an anhydride of unsaturated carboxylic acid, and particularly maleic anhydride. In the acid-modified propylene polymer, it is preferable that the percentage of acid component content is not less than 0.05 wt % nor more than 0.45 wt % of the propylene polymer.

The following is a description of the materials composing the adhesive agent other than the acid-modified propylene polymer. The base agent of the adhesive agent can be, for example, a propylene-α-olefin copolymer. As long as it contains the acid-modified propylene, the adhesive agent can further contain an ethylene-vinyl acetate copolymer and its acid-modified material or an ethylene-(meth) acrylic ester copolymer and its acid-modified material in order to improve the strength of adhesion to the metal substrate. The adhesive agent can further contain an anti-blocking agent (blocking inhibitor) made from inorganic material. The anti-blocking agent made from inorganic material can be protean silica, feldspar, mica, or zinc oxide.

The adhesive agent is preferably a mixture of an acid-modified propylene homopolymer, a propylene-ethylene-butene random copolymer (the percentage of ethylene content is 0.5 to 10 wt %, the percentage of butene content is 0.5 to 10 wt %), an ethylene-methyl (meth) acrylate copolymer (the percentage of methyl (meth) acrylate content is 10 to 30 wt %), and an anti-blocking agent. The percentage of each content shown in the parentheses is relative to each material; for example, "an A-B copolymer (the percentage of B content is 1 to 2 wt %)" indicates that the percentage of B content is 1 to 2 wt % of the entire A-B copolymer. More preferably, the mixture material meets all of the following requirements. Note that the percentage of content in each requirement is with regard to the whole adhesive agent. (Requirement 1) the percentage of the acid-modified propylene homopolymer content is 30 to 47 wt %, (requirement 2) the percentage of the propylene-ethylene-butene random copolymer content is 47 to 69 wt %, (requirement 3) the percentage of the ethylene-methyl (meth) acrylate copolymer content is 0.1 to 4 wt %, and (requirement 4) the percentage of the anti-blocking agent content is 0.05 to 5 wt %.

The thickness of the adhesive layer 3 is 0.2 to 50 $\mu$m, preferably 0.5 to 20 $\mu$m, and more preferably 0.8 to 10 $\mu$m. When it is below 0.2 $\mu$m, the strength of adhesion to the metal substrate is low, so that the adhesive layer is easily exfoliated during the draw-forming process or the like. Even if the adhesive layer is designed to be not less than 50 $\mu$m thick, the strength of adhesion corresponding to the thickness is saturated, thereby causing a higher cost. The appropriate thickness should be determined depending on the shaping process to be applied.

The following is a description of the case where at least one of the adhesive layer 3, first resin layer 1, and second resin layer 2 further contains zinc oxide fine particles. Since the zinc oxide fine particles have the property of absorbing a sulfide such as hydrogen sulfide, a laminate film which blocks the sulfide can be provided. A specific example is shown as follows. Even if a laminate film not containing zinc oxide particles is laminated on the inner surface of a can, when the content of the can is salmon or trout pickled in vinegar or the like, hydrogen sulfide developing from the content permeates the laminate film and blackens the surface of the metal substrate. On the other hand, with the use of a laminate film capable of suppressing the permeation of a sulfide, even if the content develops a sulfide such as salmon or trout pickled in vinegar, the surface of the metal substrate can be prevented from discoloring like blackening.

The function of absorbing hydrogen sulfide can be executed effectively when the concentration of the zinc oxide fine particles is 0.001 g/m$^2$ to 15 g/m$^2$, preferably 0.01 g/m$^2$ to 10 g/m$^2$, and more preferably 0.05 g/m$^2$ to 1 g/m$^2$. The function of absorbing hydrogen sulfide can not be executed fully when the amount of the zinc oxide fine particles added is below 0.001 g/m$^2$. When the amount exceeds 15 g/m$^2$, the properties of the laminate film itself such as transparency, smoothness, and gloss are deteriorated.

Since the zinc oxide fine particles have the function as an anti-blocking agent, it is preferable to add zinc oxide fine particles to the adhesive layer 3. However, when the zinc oxide fine particles exceeding 15 g/m² are added exclusively to the adhesive layer 3, the strength of adhesion decreases. Therefore, it is preferable to add the zinc oxide fine particles only to the adhesive layer 3 within the range not deteriorating the strength of adhesion. When the sulfide cannot be blocked sufficiently by the adhesive layer 3 only, the zinc oxide fine particles can be added also to the first resin layer 1 and the second resin layer 2.

When the average diameter of the zinc oxide fine particles (generally referred to as secondary particles) contained in the adhesive layer 3 is 0.5 μm to 5 μm, it is optimum in terms of blocking performance against the sulfide. It should be noted that the diameter of the zinc oxide fine particles changes in the process of film formation. Therefore, in order to obtain the optimum secondary particles, zinc oxide fine particles having an average particle diameter of 10 nm to 100 nm can be used as the zinc oxide fine particles (generally referred to as primary particles) of raw material.

Embodiment I-1

A laminate film was formed by co-extruding the material of the first resin layer 1, the material of the second resin layer 2, and the material of the adhesive layer 3 at 240° C. Next, the laminate film was rolled out vertically at 110° C. to be 5 times longer, and then was stretched horizontally by a tenter at 130° C. to be 9 times longer, thereby forming a laminate film of 30 μm thick. In the produced laminate film, the first resin layer 1, second resin layer 2, adhesive layer 3 were 2 μm, 23 μm, and 5 μm thick, respectively. The first resin layer 1 was made from a mixture material consisting of 35 wt % of a first propylene homopolymer (NMR pentad fraction: 98.5%, MFR: 5 g/10 min (230° C., 21.18 N), melting point: 167° C.) and 65 wt % of a second propylene homopolymer (NMR pentad fraction: 94.0%, MFR: 3 g/10 min (230° C., 21.18 N), melting point: 162° C.). The second resin layer 2 was made from a mixture material consisting of 70 wt % of a propylene-ethylene-butene random copolymer (the percentage of ethylene content: 2.2 wt %, the percentage of 1-butene content: 2.7 wt %, MFR: 2 g/10 min (230° C., 21.18 N), a Vicat softening point: 128° C., a melting point: 140° C.) and 30 wt % of ethylene-propylene rubber (the percentage of ethylene content: 70 wt %, MFR:2 g/10 min (190° C., 21.18 N), a Vicat softening point: 90° C.). The adhesive layer 3 was made from a mixture material consisting of 40 wt % of maleic anhydride acid-modified polypropylene with a modification ratio of 0.2 wt % having as a base polymer a propylene homopolymer (MFR: 5 g/10 min (230° C., 21.18 N), a melting point: 160° C.), 56 wt % of a propylene-ethylene-butene random copolymer (the percentage of ethylene content: 2.2 wt %, the percentage of 1-butene content: 2.7 wt %, MFR: 2 g/10 min (230° C., 21.18 N)), 2 wt % of an ethylene-methyl acrylate copolymer (the percentage of methyl acrylate content: 20 mol %, MFR: 20 g/10 min (190° C., 21.18 N)), and 2 wt % of protean silica.

Embodiment I-2

A laminate film was fabricated in the same manner as in Embodiment I-1 except that the first resin layer 1, second resin layer 2, and adhesive layer 3 were designed to be 1 μm, 16 μm, and 3 μm thick, respectively, to have a total thickness of 20 μm, and the adhesive agent of the adhesive layer 3 contained 2.5 wt % (corresponding to 0.068 g/m²) of zinc oxide fine particles (primary particles having an average particle diameter of 30 nm and a specific surface of 30 m²/g).

Figure 2:
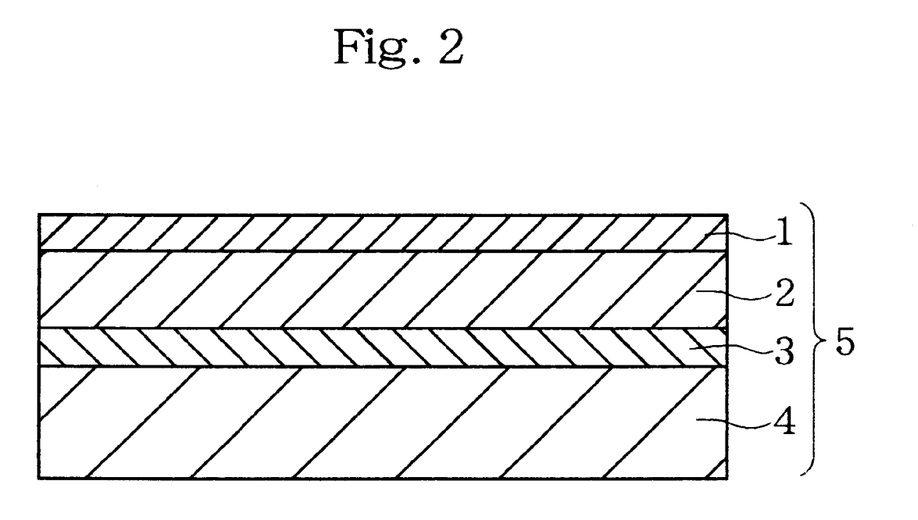
FIG. 2 is a cross sectional view conceptually showing an example of the laminated structure of the present invention.

(II) The laminated structure of the present invention will be described as follows based on FIG. 2. The laminated structure is provided with the laminate film of the present invention fixedly bonded to the surface of the substrate. Therefore, the explanation of the laminate film will be omitted.

The laminate film can be bonded to the substrate by making use of the well-known art. The well-known art includes a squeezing process and a welding process. When the laminated structure is subjected to a shaping process later, it is preferable to apply a welding process with a heated roll or a welding process with a burner. When the welding process is applied, the substrate and the laminate film can be heated in advance if necessary. When the welding process is done with a heated roll, it is preferable that a laminate temperature (welding temperature) is 100° C. to 300° C., preferably 120° C. to 200° C., and more preferably 130° C. to 170° C.

Embodiment II-1

Figure 3:
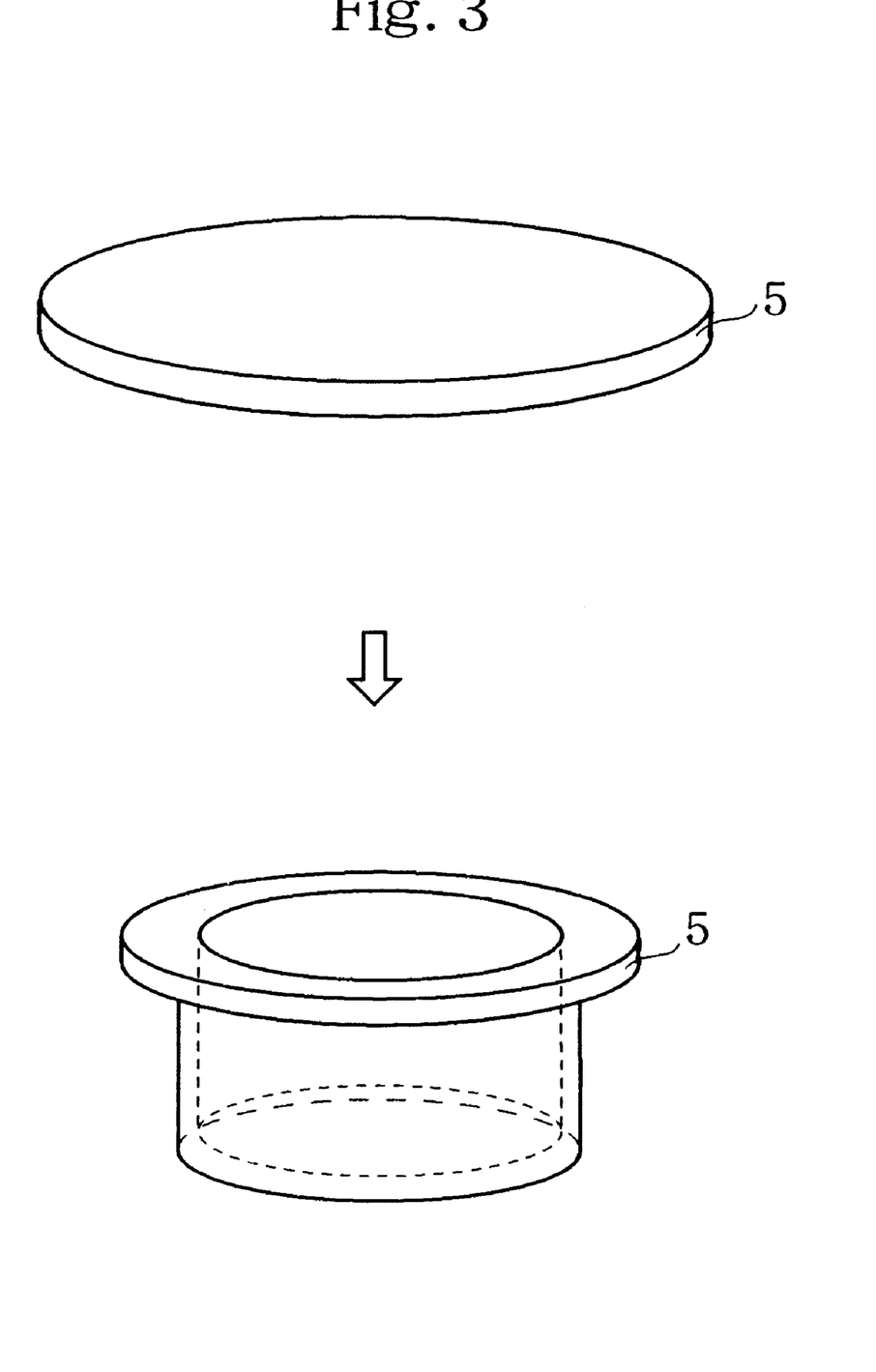
FIG. 3 is a conceptually illustrated perspective view to explain a draw-forming process.

A laminate steel sheet was manufactured by welding the laminate film of Embodiment I-1 and a tin-free steel sheet 4 of 0.2 mm thick by using a heated roll of 160° C. The strength of adhesion between the laminate film and the tin-free steel sheet 4 is shown in Table 1. The yields of quality cans obtained by applying a draw-forming process (refer to FIG. 3) to the laminate steel sheet 5 of the present embodiment are also shown in Table 1.

Here, the strength of adhesion between the laminate film and the tin-free steel sheet 4 was measured by conducting 180° exfoliation under the conditions of a sample width of 1 cm and a stretching rate of 200 mm/min. The yields of the quality cans mean the rate of laminate films not whitening or breaking (the value obtained by dividing the number of satisfactory products by the number of the products subjected to the process) when the laminate steel sheet is canned by the draw-forming process. In the measurement of the yields of quality cans, the laminate steel sheet 5 composed of the laminate film and the tin-free steel sheet 4 was subjected to the draw-forming process to form into cans of 100 mm in diameter and 40 mm in depth in such a manner that the laminate film forms their inner surface.

Comparative Example II-1

First, a laminate film was manufactured in the same manner as in Embodiment I-1 except that the first resin layer 1, second resin layer 2, and adhesive layer 3 were designed to be 12 μm, 13 μm, and 5 μm thick, respectively. Then, a laminate steel sheet 5 was manufactured in the same manner as in Embodiment II-1 by using the laminate film of the present comparative example and a 0.2 mm-thick tin-free steel sheet.

Table 1 shows the strength of adhesion of the laminate film and the tin-free steel sheet 4 with regard to the laminate steel sheet 5 of the present comparative example, and the yields of quality cans. Table 1 indicates that the present comparative example has lower yields than Embodiment II-1. This is because the first resin layer 1 was as thick as 12 μm.

Comparative Example II-2

First, a laminate film was manufactured in the same manner as in Embodiment I-1 except that the first resin layer 1, second resin layer 2, and adhesive layer 3 were designed to be 23 μm, 2 μm, and 5 μm thick, respectively. Then, a laminate steel sheet 5 was manufactured in the same manner as in Embodiment II-1 by using the laminate film of the present comparative example and a 0.2 mm-thick tin-free steel sheet 4.

Table 1 shows the strength of adhesion of the laminate film and the tin-free steel sheet 4 with regard to the laminate steel sheet 5 of the present comparative example, and the yields of quality cans. Table 1 indicates that the present comparative example has far lower yields than Embodiment II-1. This is because the first resin layer 1 was as thick as 23 μm, and the second resin layer 2 was thin (0.08 times as thick as the first resin layer).

Comparative Example II-3

A laminate film was manufactured in the same manner as in Embodiment I-1 except that the first resin layer 1 was made by using a propylene-ethylene random copolymer (the percentage of ethylene content: 0.5 wt %, MFR: 2 g/10 min (230° C., 21.18 N), a melting point:158° C.) and the second resin layer 2 was made by using a propylene homopolymer (NMR pentad fraction: 98.5%, MFR: 5 g/10 min (230° C., 21.18 N), a Vicat softening point: 162° C., a melting point: 167° C.). Then, a laminate steel sheet was manufactured in the same manner as in Embodiment II-1 by using the laminate film of the present comparative example and a 0.2 mm-thick tin-free steel sheet.

Table 1 shows the strength of adhesion of the laminate film and the tin-free steel sheet 4 with regard to the laminate steel sheet 5 of the present comparative example, and the yields of quality cans. Table 1 indicates that the present comparative example has far lower yields than Embodiment II-1. This is because the second resin layer 2 has a higher Vicat softening point and a higher melting point than the first resin layer 1.

Embodiment II-2

A laminate steel sheet 5 was manufactured in the same manner as in Embodiment II-1 by using the laminate film of Embodiment I-2 and a 0.2 mm-thick tin-free steel sheet 4. The strength of adhesion between the laminate film of the present embodiment and the tin-free steel sheet 4 is shown in Table 1. Next, the laminate steel sheet of the present embodiment was formed into cans by the draw-forming process in the same manner as in Embodiment II-1. The yields of quality cans are shown in Table 1.

Ten good cans were filled with salmon pickled in vinegar, sealed with a lid, and left at room temperature. They were opened two month later and the inner surfaces of these cans were observed to find that there was no discoloring in any can.

Note that white fine powders can be mixed into the first layer 1, second layer 2, and/or adhesive layer 3 within the scope of the present invention. In the case of food cans, even with the use of a laminate film containing zinc oxide fine particles which are considered to be sufficient in amount for the absorption of a sulfide to be developed, there is no influence on the quality of the contents; however, the inner surfaces of the cans may cause discoloring. Mixing white fine powder into the laminate film can hide unexpectedly happened discoloration of the inner surfaces of the cans. This helps to avoid consumers from being worried about the quality of the contents by finding harmless discoloration of the cans. The white fine powder can be titanium oxide, talc, calcium carbonate, or the like. The amount of the white fine powder to be added should be determined by taking the blocking performance of the color of the white fine powder to be used into consideration.

Comparative Example II-4

A laminate film was manufactured in the same manner as in Embodiment I-2 except that zinc oxide fine particles were not added. Next, a laminate steel sheet 5 was manufactured in the same manner as in Embodiment II-2 by using the laminate film of the present comparative example and a 0.2 mm-thick tin-free steel sheet 4, and then formed into cans by a draw-forming process. Table 1 shows the strength of adhesion of the laminate film of the present comparative example and the tin-free steel sheet, and the yields of quality cans.

Ten good cans were filled with salmon pickled in vinegar, sealed with a lid, and left at room temperature. They were opened two month later and the inner surfaces of these cans were observed to find that nine of the ten cans had discoloration of brown or black. The remaining one also had yellowish coloring.

TABLE 1

|  | STRENGTH OF ADHESION (N/cm) | YIELDS OF QUALITY CANS |
|---|---|---|
| EMBODIMENT II-1 | 18.2 | 0.99 |
| COMPARATIVE EXAMPLE II-1 | 17.1 | 0.33 |
| COMPARATIVE EXAMPLE II-2 | 16.8 | 0.01 |
| COMPARATIVE EXAMPLE II-3 | 17.8 | 0.01 |
| EMBODIMENT II-2 | 13.3 | 0.99 |
| COMPARATIVE EXAMPLE II-4 | 13.7 | 0.99 |

INDUSTRIAL APPLICABILITY

As described hereinbefore, the present invention provides a laminate film having higher shaping processability than conventional laminate films. The present invention also provides a laminated structure having the laminate film with excellent shaping processability on the substrate. Thus, each object of the present invention can be fully achieved.

In addition, mixing zinc oxide fine particles into a laminate film can realize a laminate film excellent in shaping processability and blocking performance of a sulfide such as hydrogen sulfide, and also realize a laminated structure excellent in shaping processability and corrosion resistance to a sulfide.

Hence, the present invention has great industrial significance.

What is claimed is:

1. A laminate film comprising:
    an adhesive layer composed of an adhesive agent;
    a first resin layer composed of a polypropylene resin and the first resin layer being formed above the adhesive layer; and
    a second resin layer formed between the first resin layer and the adhesive layer, the second resin layer containing a propylene-α-olefin copolymer as a main component, the second resin layer being at least 0.5 times thicker than the first resin layer, the second resin layer having a Vicat softening point lower than that of the first resin layer, and the second resin layer having a melting point lower than that of the first resin layer by 2° C. or more; and zinc oxide fine particles in at least one of the adhesive layer, the first resin layer, and the second resin layer.

2. The laminate film according to claim 1, wherein said adhesive agent contains an acid-modified propylene polymer.

3. The laminate film according to claim 2, wherein the first resin layer has a melting point of not less than 155° C.

4. The laminate film according to claim 3, wherein the first resin layer is 0.1 µm to 10 µm thick, and the adhesive layer is 0.2 µm to 50 µm thick.

5. The laminate film according to claim 4, wherein the second resin layer further contains rubber material.

6. The laminate film according to claim 4, wherein the second resin layer further contains at least one material selected from the group consisting of a petroleum resin, rosin, rosin ester, a terpene resin, hydrogenated rosin, hydrogenated rosin ester, and a hydrogenated terpene resin.

7. The laminate film according to claim 4, wherein the polypropylene resin of the first resin layer is a mixture of a propylene homopolymer having an NMR pentad fraction of not less than 97% and a propylene homopolymer having an NMR pentad fraction below 97%.

8. A laminated structure comprising:

a substrate;

an adhesive layer composed of an adhesive agent and the adhesive layer being formed on a surface of the substrate;

a first resin layer composed of a polypropylene resin and the first resin layer being formed on the adhesive layer;

a second resin layer formed between the first resin layer and the adhesive layer, the second resin layer containing a propylene-α-olefin copolymer as a main component, the second resin layer being at least 0.5 times thicker than the first resin layer, the second resin layer having a Vicat softening point lower than that of the first resin layer, and the second resin layer having a melting point lower than that of the first resin layer by 2° C. or more; and zinc oxide fine particles in at least one of the adhesive layer, the first resin layer, and the second resin layer.

9. The laminated structure according to claim 8, wherein said substrate is a steel sheet;

said adhesive agent contains an acid-modified propylene polymer; and the first resin layer has a melting point of not less than 155° C. and a thickness of 0.1 µm to 10 µm.

* * * * *

UNITED STATES PATENT AND TRADEMARK OFFICE
CERTIFICATE OF CORRECTION

PATENT NO.    : 6,713,166 B2
DATED         : March 30, 2004
INVENTOR(S)   : Takeshi Yamamoto It is certified that error appears in the above-identified patent and that said Letters Patent is hereby corrected as shown below:

<u>Column 6,</u>
Line 3, "the acid-modified propylene" into -- the acid -modified propylene polymer --.
Line 5, change "acrylic ester copolymer" into -- acrylate copolymer --.

Signed and Sealed this

Twenty-fourth Day of August, 2004

JON W. DUDAS
*Director of the United States Patent and Trademark Office*